US007505935B2

(12) United States Patent
Mendiola et al.

(10) Patent No.: US 7,505,935 B2
(45) Date of Patent: Mar. 17, 2009

(54) TRADING AND AUCTION SYSTEM, AND METHODS FOR THE AUTHENTICATION OF BUYERS AND SELLERS AND FOR THE TRANSMISSION OF TRADING INSTRUCTIONS IN A TRADING AND AUCTION SYSTEM

(75) Inventors: Dennis Mendiola, New York, NY (US); Gilpatrick R. Garcia, Pasig (PH)

(73) Assignee: Chikka Pte Ltd, Singapore (SG)

( * ) Notice: Subject to any disclaimer, the term of this patent is extended or adjusted under 35 U.S.C. 154(b) by 851 days.

(21) Appl. No.: 09/878,338

(22) Filed: Jun. 12, 2001

(65) Prior Publication Data

US 2002/0032641 A1 Mar. 14, 2002

Related U.S. Application Data

(60) Provisional application No. 60/212,822, filed on Jun. 21, 2000.

(51) Int. Cl.
*G06Q 40/00* (2006.01)

(52) U.S. Cl. ................. 705/37; 39/14; 39/26; 709/318; 709/206; 455/466; 379/93.24; 370/352; 713/182

(58) Field of Classification Search .................... 705/14, 705/26, 37, 39; 709/318, 206; 455/466; 379/93.24; 713/201, 182; 370/352
See application file for complete search history.

(56) References Cited

U.S. PATENT DOCUMENTS 6,058,168 A * 5/2000 Braband .................. 379/93.24

(Continued)

FOREIGN PATENT DOCUMENTS

WO    WO 00/22906    * 4/2000

OTHER PUBLICATIONS

Allen T. Cheng, Jul. 28, 2000, "Shopping by Cellphone -Internet and mobile communications companies think 'm-commerce' has a nice ring to it" (www.pathfinder.com/asiaweek/technology/2000/0728/tech.main.html).*

(Continued)

*Primary Examiner*—Harish T Dass
(74) *Attorney, Agent, or Firm*—Intellectual Property Law Group LLP; Otto O. Lee; Juneko Jackson

(57) ABSTRACT

A trading and auction system (10), and a method for the authentication of buyers and sellers and for the transmission of trading instructions in a trading and auction system (10) is disclosed. To register with the trading and auction system (10), a user must provide a unique identifier of a messaging-capable wireless device (22) belonging to the user. After assigning a password to the user, the trading and auction system (10) communicates the password to the user and receives a confirmation of said password from said user, with at least one of the steps of communicating the password and receiving a confirmation of the password being performed using the wireless device's messaging capability (22). The user's account or trading instruction is activated if the password is correct. The trading and auction system (10) assigns a unique identification number to each product or service for sale or auction. Messages are sent to a buyer's wireless device (22) concerning offers or bids made by that buyer in relation to a product or service, with the unique identification number of the product or service included in a 'Sender' field of each message. The buyer can send further trading instructions for the product by simply replying to the received message and entering a trading instruction. The trading and auction system (10) processes messages concerning a buyer's trading instructions on a product or service from that buyer's wireless device (22) by: determining the product or service by extracting and recognizing the unique identification number of the product or service from a 'Recipient' field of received messages; identifying the buyer by extracting and recognizing the unique identifier of the wireless device from the 'Sender' field of each message and parsing a text body of each message to determine the buyer's trading instructions for that product or service.

32 Claims, 2 Drawing Sheets

U.S. PATENT DOCUMENTS

| | | | | |
|---|---|---|---|---|
| 6,134,441 | A * | 10/2000 | Astrom et al. | 455/445 |
| 6,253,188 | B1 * | 6/2001 | Witek et al. | 705/14 |
| 6,367,014 | B1 * | 4/2002 | Proust et al. | 713/182 |
| 6,449,601 | B1 * | 9/2002 | Friedland et al. | 705/37 |
| 6,587,693 | B1 * | 7/2003 | Lumme et al. | 455/466 |
| 6,769,067 | B1 * | 7/2004 | Soong | 726/2 |
| 6,961,330 | B1 * | 11/2005 | Cattan et al. | 370/352 |
| 2002/0046299 | A1 * | 4/2002 | Lefeber et al. | 709/318 |
| 2004/0224706 | A1 * | 11/2004 | Lorello et al. | 455/466 |

OTHER PUBLICATIONS

Business Editors "AuctionAnything.com Teams With Datalink.net to Wirelessly Enable Auctions; Auction Enthusiasts to Receive Alerts to Their Existing Pager, PCS phone or PDA" Business Wire. New York: Jul. 27, 1999. pp. 1.*

* cited by examiner

TRADING AND AUCTION SYSTEM, AND METHODS FOR THE AUTHENTICATION OF BUYERS AND SELLERS AND FOR THE TRANSMISSION OF TRADING INSTRUCTIONS IN A TRADING AND AUCTION SYSTEM

CROSS REFERENCE TO RELATED APPLICATION

This application claims the benefit to U.S. Provisional Application No. 60/212,822, filed Jun. 21, 2000, the content of which is incorporated herein by reference.

FIELD OF THE INVENTION

The present invention relates to a trading and auction system, and to methods for the authentication of buyers and sellers and for the transmission of trading instructions in a trading and auction system.

The invention has particular, although not exclusive, utility in allowing users of wireless devices with messaging capability, such as mobile phones, to participate in auctions and trades quickly and efficiently.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

With the rapid growth of the Internet has emerged multiple ways of facilitating transactions between buyers and sellers conveniently, quickly, and usually securely. Electronic commerce, commonly referred to as eCommerce, is continuing to grow at an extraordinary rate. Companies such as Amazon.com and eBay.com are examples of popular eCommerce Internet sites.

Amazon.com allows a shopper equipped with a computer connected to the Internet and a credit card to purchase items displayed on its website. eBay.com, on the other hand, is a forum for individual buyers and sellers to engage in trades, covering a great variety of merchandise by motivated sellers and buyers who may trade anything from a rare coin collection to a second-hand piece of furniture.

Websites that facilitate auctioning of goods and services, such as eBay.com, derive success from quickly building a critical mass of sellers and buyers who trust each other—that the goods are described accurately by the sellers, with full disclosure, that they will be delivered as promised by the sellers, and the payment will be made as promised by the buyers.

However, unscrupulous buyers and sellers may create multiple accounts so as to manipulate a bid for a particular product. For example, a seller can create multiple fictitious buyer accounts that will also bid for his product, with the intended result of inflating the final price by posting higher and higher bids, which legitimate buyers are supposed to follow. Legitimate buyers are misled into thinking that a real frenzy to purchase the product is taking place.

Another problem consists of sellers and buyers, who after closing a particular transaction, simply choose to walk away from the deal, thereby reneging on an auction contract.

These problems are well known and many auction sites have sought to address them by introducing various means of bidder authentication and deal compliance. Authentication refers to the proactive verification of a particular buyer or seller's identity. This typically takes the form of a process referred to as "enrollment" or some form of registration, wherein buyers and sellers fill out various forms or produce evidence establishing their true identities. Deal compliance is reinforced by, for example, telling buyers and sellers that if they are caught engaging in unscrupulous bids or reneging on deals, they will be forever barred from doing business on the auction site.

Buyers wanting to bid for a product at an auction website typically use a computer equipped with an Internet connection and a browser. More recently, several auction websites have begun to pursue strategies that give users access to their auction accounts using wireless devices. Most use wireless devices, such as pagers or SMS (short message service)-enabled mobile phones, for the purpose of notifying users of the status of their bids or transaction. For instance, if a bid is beaten, a message can be sent to all participating buyers that have wireless devices, such as pagers or mobile phones with SMS reception enabled.

Some systems allow users to send commands from wireless devices that are enabled for two-way data transmission, for example using SMS. However, current systems are cumbersome, requiring users to embed e-mail addresses or other fixed commands in the text body of the SMS message, instructing the auction engine which action to take. Once sent by the bidder, the message is then sent to the specified e-mail address, eventually to reach the auction engine. Since the e-mail address is typically a common one to which several other bidders send their messages, the instruction for the auction engine and the particular product being bid upon must be specified within the message itself. Alternatively, it is also possible to specify different e-mail addresses pertaining to different commands, such as bid up commands. However, this would also entail that the particular product and simplified instruction be included in the message itself.

Mobile devices equipped with Internet access via the Wireless Application Protocol or "WAP" are expected to gain popularity in the coming years. Some auction sites now allow mobile devices using WAP access to their site. To access the Internet, users dial-in with their mobile devices to "WAP Internet gateways." The mobile user then browses the Internet using their WAP phone's small screen.

In the context of an auction website, the user accesses the auction website using their WAP phone and logs in, perhaps enters a password, and then eventually gains access to his account. The "logged in" mobile user may now engage in basic auction activities, such as reading messages notifying him of the status of a bid, and instructing the auction server to raise his bid if it has been beaten.

The fact that the WAP user is required to have a WAP-enabled device as opposed to using the present "legacy" digital mobile phones acts as a limiting factor to growth of auction use through this medium. Further, until the introduction of General Packet Radio Service or "GPRS" or true "anytime, anywhere" wireless access for GSM devices, WAP Internet access will continue to be cumbersome, requiring users to dial-in to a gateway and log in to the auction website each time they want to access their accounts. This necessarily takes time and in most instances, costs much more than a typical computer and browser-based Internet access. Hence, WAP access via a mobile device is simply an alternative to a computer connected to the Internet. The log in process, bid up process, and so on, is similar to the processes a computer Internet user would perform to do the same things on an auction website.

Although the preceding discussion focused on auction websites, where buyers outbid each other for a certain product or service, many of the above discussions can also be applied to other types of eCommerce and auction business models, such as reverse auctions (i.e., buyers set prices which sellers are supposed to meet) and fixed price models.

SUMMARY OF THE INVENTION

This invention seeks to address the present limitations of mobile auction processes through the use of the two-way SMS communication facility found in many digital wireless devices. The invention is particularly suitable for use with current "legacy" GSM mobile devices equipped with SMS, however any SMS-capable device may be used, such as Code Division Multiple Access (CDMA) devices.

Most GSM networks have SMS facilities that allow short messages to be exchanged between its subscribers. A user typically types a short text message into their GSM mobile phone, and then enters the mobile phone number of the intended recipient of the message as that recipient's address. Once sent, the message is processed by the GSM network's Short Message Service Center's (SMSC) server system and forwarded to the mobile phone of the recipient.

The invention includes an auction server that is directly linked to the mobile network's short messaging service. In the present embodiment of the invention, the auction server communicates directly with the GSM network's Short Message Service Center's ("SMSC") server system to send and receive short messages or commands via SMS. The auction server communicates with the SMSC via the Internet, a direct communication line, or other suitable communication system. Short messages are sent and received from the auction server system using the GSM networks' message protocol. In one embodiment of the invention, the protocol used is the Computer Interface Message Distribution Protocol version Two ("CIMD2"), a system adopted by GSM mobile phone and network manufacturers Nokia and Ericsson. The computer server can also be arranged to support any of the other popular short message protocols, e.g., SMPP or Simple Message Paging Protocol.

In one form, the invention takes advantage of the notion that a mobile phone number is likely unique to a particular user, and hence can be used as a more reliable means of authenticating buyers or sellers than an email address, for instance. A user is likely to have a single mobile phone number, whereas users with multiple email addresses are commonplace. A trader who has registered his mobile phone number is less likely to renege on a deal, since he can be easily tracked down and barred from engaging in future auction activities. Once barred, a trader will have to access another mobile phone number to re-register and continue using the auction system. This is more effective than using simply an email address, since email addresses are somewhat anonymous and relatively inexpensive to set up as compared to mobile phones. Before a buyer or seller can use the auction system, they will need to register with the auction server. In the present embodiment of the invention, providing a mobile phone number is a compulsory part of the registration process, since the user's password is sent to their mobile phone using the mobile network's SMS messaging system.

In another form, the invention assigns unique mobile-phone-like numeric addresses to each product or service being bid out on the auction server. This unique numeric address is used as an identifier in SMS messages sent from the auction server, allowing a user to more conveniently and quickly send a command to the auction server (e.g., raise a bid to a particular level) via simple SMS transmissions (e.g., by simply hitting the "Reply" option found in most digital wireless devices with two-way SMS capability and then entering a generic command or numeric message in the body of the message). Also, unlike WAP access, this action does not require the user to connect or dial-in to the Internet explicitly.

In accordance with a first aspect of this invention, there is provided a method for the authentication of buyers and sellers and for the transmission of trading instructions in a trading and auction system, comprising the steps of:

Requiring that a prospective buyer or seller register with the trading and auction system before being able to place trading instructions, including requiring that said prospective buyer or seller provide a unique identifier of a messaging-capable wireless device belonging to the prospective buyer or seller;

Assigning a password to said prospective buyer or seller;

Communicating said password to said prospective buyer or seller and receiving a confirmation of said password from said prospective buyer or seller, wherein at least one of said steps of communicating said password and receiving a confirmation of said password are performed using said wireless device's messaging capability;

Activating said prospective buyer or seller's account or trading instruction if said password is correct;

Assigning a unique identification number to each product or service for sale or auction at said trading and auction system;

Sending messages to a buyer's wireless device concerning offers or bids made by that buyer in relation to a product or service, with the unique identification number of the product or service included in a 'Sender' field of each message;

Receiving messages concerning a buyer's trading instructions on a product or service from that buyer's wireless device, determining the product or service by extracting and recognizing the unique identification number of the product or service from a 'Recipient' field of received messages, identifying the buyer by extracting and recognizing the unique identifier of the wireless device from the 'Sender' field of each message and parsing a text body of each message to determine the buyer's trading instructions for that product or service.

Preferably, said method further comprises the step of requiring that a buyer authenticate their identity with the trading and auction system when placing their first trading instruction in relation to a product or service by an exchange of messages between the trading and auction system, in which at least one of said messages are sent or received using said wireless device's messaging capability.

In one arrangement, said step of communicating said password to said prospective buyer or seller is performed over a computer network, and said step of receiving a confirmation of said password from said prospective buyer or seller is performed using said wireless device's messaging capability.

In an alternative arrangement, said step of communicating said password to said prospective buyer or seller is performed using said wireless device's messaging capability, and said step of receiving a confirmation of said password from said prospective buyer or seller is performed over a computer network.

Preferably, said wireless device is a GSM device with SMS capability, said wireless device being serviced by a GSM network including a SMSC server to control and manage SMS to and from said wireless device, wherein said trading and auction system is in direct communication with said SMSC server.

Preferably, said step of sending messages to a buyer's wireless device includes the step concatenating an access identification number with the unique identification number of the product or service and placing said concatenated number in the 'Sender' field of each message, said SMSC server using the access identification number to identify SMS from wireless devices destined for said trading and auction system and to forward such SMS directly to the trading and auction system.

Preferably, said trading and auction system is connected to said SMSC server via a computer network.

In accordance with a second aspect of this invention, there is provided a method for the authentication of buyers and sellers in a trading and auction system, comprising the steps of:

Requiring that a prospective buyer or seller register with the trading and auction system before being able to place trading instructions, including requiring that said prospective buyer or seller provide a unique identifier of a messaging-capable wireless device belonging to the prospective buyer or seller;

Assigning a password to said prospective buyer or seller;

Communicating said password to said prospective buyer or seller and receiving a confirmation of said password from said prospective buyer or seller, wherein at least one of said steps of communicating said password and receiving a confirmation of said password are performed using said wireless device's messaging capability; and Activating said prospective buyer or seller's account or trading instruction if said password is correct.

Preferably, said method further comprises the step of requiring that a buyer authenticate their identity with the trading and auction system when placing their first trading instruction in relation to a product or service by an exchange of messages between the trading and auction system, in which at least one of said messages are sent or received using said wireless device's messaging capability.

In one arrangement, said step of communicating said password to said prospective buyer or seller is performed over a computer network, and said step of receiving a confirmation of said password from said prospective buyer or seller is performed using said wireless device's messaging capability.

In an alternative arrangement, said step of communicating said password to said prospective buyer or seller is performed using said wireless device's messaging capability, and said step of receiving a confirmation of said password from said prospective buyer or seller is performed over a computer network.

Preferably, said wireless device is a GSM device with SMS capability, said wireless device being serviced by a GSM network including a SMSC server to control and manage SMS to and from said wireless device, wherein said trading and auction system is in direct communication with said SMSC server.

Preferably, said step of sending messages to a buyer's wireless device includes the step concatenating an access identification number with the unique identification number of the product or service and placing said concatenated number in the 'Sender' field of each message, said SMSC server using the access identification number to identify SMS from wireless devices destined for said trading and auction system and to forward such SMS directly to the trading and auction system.

Preferably, said trading and auction system is connected to said SMSC server via a computer network.

In accordance with a third aspect of this invention, there is provided a method for the transmission of trading instructions in a trading and auction system, comprising the steps of:

Assigning a unique identification number to each product or service for sale or auction at said trading and auction system;

Sending messages to a buyer's wireless device concerning offers or bids made by that buyer in relation to a product or service, with the unique identification number of the product or service included in a 'Sender' field of each message;

Receiving messages concerning a buyer's trading instructions on a product or service from that buyer's wireless device, determining the product or service by extracting and recognizing the unique identification number of the product or service from a 'Recipient' field of received messages, identifying the buyer by extracting and recognizing the unique identifier of the wireless device from the 'Sender' field of each message and parsing a text body of each message to determine the buyer's trading instructions for that product or service.

Preferably, said method further comprises the step of requiring that a buyer authenticate their identity with the trading and auction system when placing their first trading instruction in relation to a product or service by an exchange of messages between the trading and auction system, in which at least one of said messages are sent or received using said wireless device's messaging capability.

In one arrangement, said step of exchanging messages comprises the steps of sending a password to said prospective buyer or seller over a computer network, and receiving a confirmation of said password from said prospective buyer or seller using said wireless device's messaging capability.

In an alternative arrangement, said step of exchanging messages comprises the steps of sending a password to said prospective buyer or seller using said wireless device's messaging capability, and receiving a confirmation of said password from said prospective buyer or seller over a computer network.

Preferably, said wireless device is a GSM device with SMS capability, said wireless device being serviced by a GSM network including a SMSC server to control and manage SMS to and from said wireless device, wherein said trading and auction system is in direct communication with said SMSC server.

Preferably, said step of sending messages to a buyer's wireless device includes the step concatenating an access identification number with the unique identification number of the product or service and placing said concatenated number in the 'Sender' field of each message, said SMSC server using the access identification number to identify SMS from wireless devices destined for said trading and auction system and to forward such SMS directly to the trading and auction system.

Preferably, said trading and auction system is connected to said SMSC server via a computer network.

In accordance with a fourth aspect of this invention, there is provided a trading and auction system, comprising:

registration handling means for receiving a unique identifier of a messaging-capable wireless device belonging to a prospective buyer or seller;

message dispatching means for sending messages to a prospective buyer or seller's wireless device;

message receiving means for receiving messages from a prospective buyer or seller's wireless device;

said registration handling means arranged to assign a password to said prospective buyer or seller, and to communicate said password to said prospective buyer or seller and receive a confirmation of said password from said prospective buyer or seller, wherein said password is communicated to said prospective buyer or seller's wireless device via said message dispatching means and/or said confirmation of said password is received from said prospective buyer or seller's wireless device via said message receiving means, said registration handling means arranged to activate said prospective buyer or seller's account or trading instruction if said confirmation of said password is correct;

unique identification number assigning means to automatically allocate a unique identification number to each product or service for sale or auction on said trading and auction system;

database means for storing the unique identification number of each product and service for sale or auction on said trading and auction system and for storing the unique identifier of each buyer or seller's wireless device; and trade and auction handling means arranged to send messages to a buyer's wireless device concerning offers or bids made by that buyer in relation to a product or service via said message dispatching means, with the unique identification number of the product or service included in a 'Sender' field of each message;

said trade and auction handling means further arranged to receive messages concerning a buyer's trading instructions on a product or service from that buyer's wireless device via said message receiving means, and to determine the product or service by extracting and recognizing the unique identification number of the product or service from a 'Recipient' field of received messages, identify the buyer by extracting and recognizing the unique identifier of the wireless device from the 'Sender' field of each message, parse a text body of each message to determine the buyer's trading instructions for that product or service and execute said trading instructions.

Preferably, said trade and auction handling means is arranged to require that a buyer authenticate their identity with the trading and auction system when placing their first trading instruction in relation to a product or service by an exchange of messages with the trading and auction system, wherein one of said messages is communicated to said buyer's wireless device via said message dispatching means and/or another of said messages is received from said buyer's wireless device via said message receiving means.

Preferably, said wireless device is a GSM device with SMS capability, said wireless device being serviced by a GSM network including a SMSC server to control and manage SMS to and from said wireless device, said message dispatching means and message receiving means being in direct communication with said SMSC server to send and receive SMS therefrom, respectively.

Preferably, said message dispatching means is arranged to concatenate an access identification number with the unique identification number of the product or service and place said concatenated number in the 'Sender' field of each message sent to a buyer concerning that product or service, said SMSC server using the access identification number to identify SMS from the buyer's wireless device destined for said trading and auction system and to forward such SMS directly to the message receiving means.

Preferably, said message dispatching means and message receiving means are connected to said SMSC server via a computer network.

In accordance with a fifth aspect of this invention, there is provided a trading and auction system, comprising:

registration handling means for receiving a unique identifier of a messaging-capable wireless device belonging to a prospective buyer or seller;

message dispatching means for sending messages to a prospective buyer or seller's wireless device;

message receiving means for receiving messages from a prospective buyer or seller's wireless device;

database means for storing the unique identifier of each buyer or seller's wireless device;

said registration handling means arranged to assign a password to said prospective buyer or seller, and to communicate said password to said prospective buyer or seller and receive a confirmation of said password from said prospective buyer or seller, wherein said password is communicated to said prospective buyer or seller's wireless device via said message dispatching means and/or said confirmation of said password is received from said prospective buyer or seller's wireless device via said message receiving means, said registration handling means arranged to activate said prospective buyer or seller's account or trading instruction if said confirmation of said password is correct.

Preferably, said wireless device is a GSM device with SMS capability, said wireless device being serviced by a GSM network including a SMSC server to control and manage SMS to and from said wireless device, said message dispatching means and message receiving means being in direct communication with said SMSC server to send and receive SMS therefrom, respectively.

Preferably, said message dispatching means and message receiving means are connected to said SMSC server via a computer network.

In accordance with a sixth aspect of this invention, there is provided a trading and auction system, comprising:

message dispatching means for sending messages to a prospective buyer or seller's wireless device;

message receiving means for receiving messages from a prospective buyer or seller's wireless device;

unique identification number assigning means to automatically allocate a unique identification number to each product or service for sale or auction on said trading and auction system;

database means for storing the unique identification number of each product and service for sale or auction on said trading and auction system; and trade and auction handling means arranged to send messages to a buyer's wireless device concerning offers or bids made by that buyer in relation to a product or service via said message dispatching means, with the unique identification number of the product or service included in a 'Sender' field of each message;

said trade and auction handling means further arranged to receive messages concerning a buyer's trading instructions on a product or service from that buyer's wireless device via said message receiving means, and to determine the product or service by extracting and recognizing the unique identification number of the product or service from a 'Recipient' field of received messages, identify the buyer by extracting and recognizing a unique identifier of the wireless device from the 'Sender' field message, parse a text body of each message to determine the buyer's trading instructions for that product or service and execute said trading instructions.

Preferably, said trade and auction handling means is arranged to require that a buyer authenticate their identity with the trading and auction system when placing their first trading instruction in relation to a product or service by an exchange of messages with the trading and auction system, wherein one of said messages is communicated to said buyer's wireless device via said message dispatching means and/or another of said messages is received from said buyer's wireless device via said message receiving means.

Preferably, said wireless device is a GSM device with SMS capability, said wireless device being serviced by a GSM network including a SMSC server to control and manage SMS to and from said wireless device, said message dispatching means and message receiving means being in direct communication with said SMSC server to send and receive SMS therefrom, respectively.

Preferably, said message dispatching means is arranged to concatenate an access identification number with the unique identification number of the product or service and place said concatenated number in the 'Sender' field of each message sent to a buyer concerning that product or service, said SMSC server using the access identification number to identify SMS from the buyer's wireless device destined for said trading and auction system and to forward such SMS directly to the message receiving means.

Preferably, said message dispatching means and message receiving means are connected to said SMSC server via a computer network.

BRIEF DESCRIPTION OF THE DRAWINGS

The invention will be better understood in the light of the following description of one specific mode thereof. The description is made with reference to the accompanying drawings, wherein.

BEST MODE(S) FOR CARRYING OUT THE INVENTION

Figure 1:
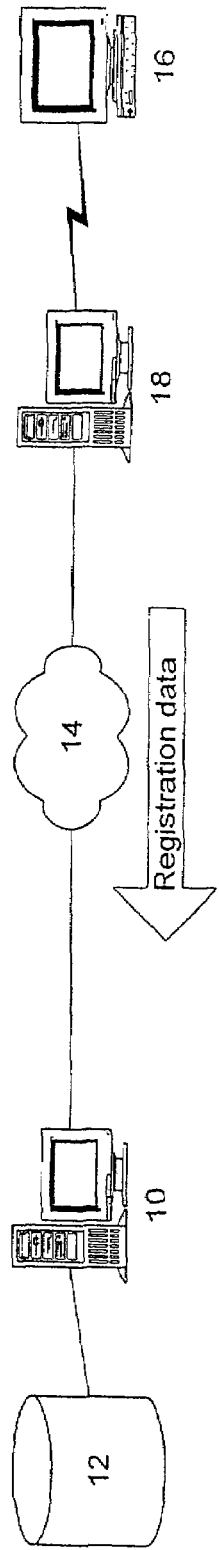
FIGS. 1 to 3 are schematic diagrams showing generally how a user can register with a trade and auction system.

The preferred embodiment of the invention is directed towards a trade and auction system that offers an improved authentication process and provides a more convenient bidding system for users with messaging-capable wireless devices. The performed embodiment will be described with reference to the wireless devices being SMS-capable GSM mobile phones, however it should be appreciated that the invention is not limited to such devices.

The trade and auction system of the embodiment includes an auction server 10. The auction server 10 comprises a registration handling means (registration handler), a message dispatching means (message dispatcher), a message receiving means (message receiver), a unique identification number assigning means (UIN assignor), a database means (database 12), and a trade and auction handing means (auction handler). These are embodied in the form of program routines that are continuously executed under the control of an operating system in the auction server 10 and thus automate the registration and binding process.

The auction server 10 is connected to a computer network 14, the internet in this embodiment. This allows a prospective user with a computer 16 to access the auction server 10 via the computer network 14 and the user's internet service provider (ISP) 18.

The auction server 10 is also linked directly or through the Internet to the GSM network's short messaging service. In particular, the message dispatcher and message receiver communicate directly with the GSM network's short message service centre's ("SMSC") server system 20 to send and receiver short messages or commands via SMS. The message dispatcher and message receiver communicate with the SMSC via the computer network 14, a direct communication line, or other suitable communication system. Short messages are sent and received from the auction server 10 using the GSM network's message protocol. In this embodiment of the invention, the protocol used is the computer interface message distribution protocol version 2 ("CIMD II") a system adopted by GSM mobile phone and network manufacturers such as Nokia. The auction server can also be arranged to support any of the popular short message protocols, such as simple message paging protocol ("SMPP").

Figure 2:
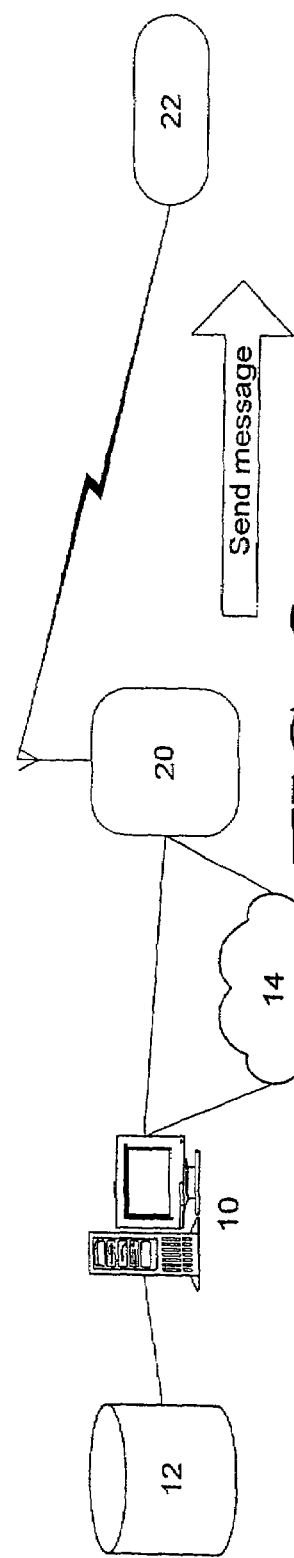
Figure 3:
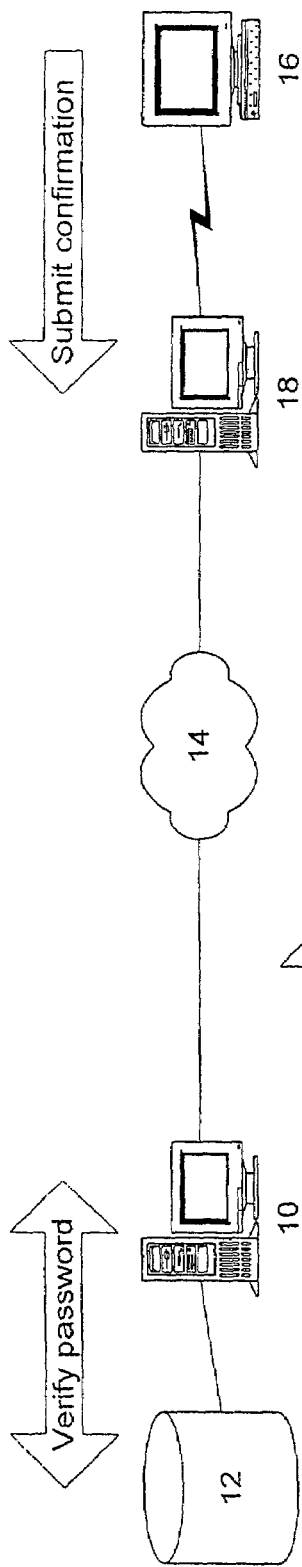

FIGS. 1 to 3 help illustrate the registration process for a prospective user.

With reference to FIG. 1, the user uses their computer 16 to access the auction server 10 via computer network 14 and their ISP 18. In the embodiment, the user 16 accesses a registration form available on the auction server 10. The registration form includes fields in which the user must enter essential data for the registration process, and further fields in which the user may enter optional data if desired.

When the user has entered data into the field in the registration form, the user then submits the information to the auction server 10. This can be achieved in a number of ways, such as using a form-based HTLM web page for the registration form, where the user can submit the entered data to the auction server 10. Upon receipt of the essential and optional data from the user's computer 16, the registration handler is invoked.

The registration handler creates a new entry in the database 12 for the user that contains the essential and optional data. In the embodiment, the essential data comprises the user's name, address, a unique identification number of a messaging-capable wireless device owned by the user such as a GSM mobile phone number, e-mail address, and nickname. The optional data in the embodiment comprises the user's date of birth, for instance.

The registration handler assigns the user a temporary password which is stored in the database 12 without being communicated to the user at this stage. The data for the user stored in the database 12 is marked as being inactive until an authentication process is completed.

FIG. 2 shows a first part of the authentication process used in the embodiment. The authentication process for new users registering with the auction server 10 is performed by the registration handler. As shown, the registration process initially involves the registration handler obtaining the temporary password assigned to the user and the user's GSM mobile phone number from the database 12.

The registration handler then instructs the message dispatcher to send an SMS message to the user's mobile telephone 22. The user's GSM mobile telephone number is used as the "recipient" field in the SMS message. The message text of the SMS message contains the temporary password assigned to the user by the registration handler. The message text may also contain an instruction to the user to enter the password and submit it to the auction server 10 using their computer 16.

FIG. 3 shows a second part of the authentication process. As shown, upon receiving the SMS message on their GSM mobile telephone 22, the user submits the temporary password to the auction server 10 using the computer 16. In the embodiment, once the user has submitted data entered on the registration form to the auction server 10, the user's computer 16 is taken to a further HTML web page that informs the user they will shortly receive a message on their mobile phone that contains a temporary password. The further HTML web page then instructs the user to enter the password in a field provided on the web page and submit it to the auction server 10. The further HTML web page then explains that once the password has been verified by the auction server 10, their account will be activated.

The user enters the password in to their computer 16 and submits the information to the auction server 10. Note that the information received by the auction server 10 must also identify the user. This can be achieved in a variety of ways, such as through the use of "cookies". A "cookie" is a data file residing on the computer 16 that contains information based on the prior activities of the user, which also allows the auction server 10 to identify a user or someone visiting the URL address corresponding to the auction server 10. For that session, a cookie, which identifies the user, is associated with that user's account Upon receipt of the password, the auction server 10 verifies that the submitted password is the same as the temporary password stored in the database 12. If the password is correct, the account for the user is marked as active and the user's computer 16 is directed towards another HTML web page that informs the user his registration was successful. Alternatively, if the submitted password does not correctly match the unique password stored in the database 12, the user's computer 16 is directed towards a HTML page that informs the user their registration attempt was unsuccessful and to try again.

Several attempts are allowed before the message handler 12 bars the user from further attempts.

Although the embodiment has been described with the authentication process consisting of a message being sent to the user's GSM device and the user entering a confirmation via their computer, it should be appreciated that in other embodiments alternative registration procedures may be adopted that would still require the user to specify their mobile phone number in order to activate their account.

For example, upon submitting the registration data, the user could be taken to a web page that contains the temporary password and instructed to send via his GSM device an SMS message containing their password to a particular telephone number. That telephone number would consist of a concatenation of the numeric access and the numeric address assigned by and recognized by the auction server 10 as that for registration purposes. The user's SMS message would then be forwarded from the SMSC 20 to the message receiver of the auction server 10. The user's id and password can then be verified, since the message text contains the password and the user's mobile telephone number will be present in the "sender" field of the SMS message.

In an enhancement to the registration process, the auction server 10 dispatches a message to the user's mobile phone 22 containing a message that instructs that user to enter the temporary password displayed on the HTML page appearing on his computer 16. This message has as its "sender" a number comprising the concatenation of a numeric access code and a numeric address pertaining to the registration handler. In many GSM devices, sending an SMS containing the temporary password can be accomplished by simply hitting the "reply" key on their GSM devices. The "sender's" address, which is the concatenation of the numeric access code and the numeric address pertaining to the registration handler, is automatically inserted in the "recipient" field of the new SMS message, thereby simplifying the sending of the temporary password.

In this particular method of registration, the message dispatcher inserts into the "sender" field of the SMS message a number comprising the concatenation of a numeric access code and a numeric address assigned by and recognized by the auction server 10 as that for registration purposes. The numeric access code is used by the SMSC server system 20 to identify the auction server 10. Any SMS messages received by the SMSC server system 20 whose "recipient" field commences with the numeric access code of the auction server 10 will be forwarded from the SMSC server system 20 directly to the auction server 10 where the message receiver processes the message.

The numeric address code for registration is a predetermined number pointing to the registration handler. This way, any messages received by the message receiver that are addressed to that numeric code pertaining to the registration handler will be forwarded by the message receiver to the registration handler.

Once registered, a user is able to browse products and services available for trade and auction and to place bids for products and services as described in further detail below. Registered users are also able to place their products for trade or auction on the auction server 10.

To add a product or service to the auction server 10, a user submits product data to the auction server 10 in a similar manner to that described above for submitting registration data. That is, the user accesses the auction server 10 using their computer 16 and accesses an "add new product" HTML web page. The user then enters product data and submits the product data to the auction server 10. In the embodiment, the following product data is required, some optional, from the user:

Title: A short description of the product that will appear in lists of products on the auction server 10.

User Id: The nickname of the registered user selling the product.

User password: The user's password, this is used to validate the product entry. If the password is incorrect, the product will not be added to the auction server 10.

Auction Type/Method: The user can specify whether the auction is to be conducted as a regular auction or as a Dutch auction, for example.

Item Description: A more detailed description of the item for sale.

Country: The seller's country.

Auction Start Date and Time: The date and time that the auction will commence. Bids for items are not accepted before an auction commences.

Auction Duration: The length of time the auction will last.

Category: A broad identification, selected from a list, of the type of product being sold. For example: antiques, music, or computers.

URL for external resources: An optional universal resource location (URL) that the user can specify for pictures, further information etc.

Computer picture file (optional): A picture of the item to be bid out that can be uploaded directly from the computer 16 to the auction server 10, via the internet 14.

Payment Method: The payment method or methods that the user will accept, such as cash, cheque, or credit card.

Shipping Information: Details concerning the shipment of the product from the seller to the successful buyer such as the cost of shipping, countries that the seller is or is not prepared to ship to, etc.

Minimum Bid: A threshold value that sets a minimum value for the first bid. Bids below the minimum bid value are disregarded by auction system 10.

Reserve Bid: An optional value specifying a price below which the seller is not prepared to sell the goods.

Bid Increment: The minimum bid increment.

Toggle to use or not use Dynamic Bid Time (optional): This switch tells the auction server to extend or not to extend the auction duration if bids are being received close to the end of the specified auction duration. When being received close to the end of the specified auction duration. When the switch is turned on, the auction will be extended until no bids are received for a length of time corresponding to the dynamic bid time.

The product data submitted by the user is checked for completeness by the auction server 10 and, if the information is complete, the UIN assignor assigns a UIN to the product. The product data and UIN are then stored in the database 12.

When the auction commences, bids concerning the product are also stored in the database 12.

A user may browse products available for auction on the auction server 10 using his computer 16 via the internet 14. If a user wishes to bid for a product, he simply selects the product and is taken to a bid submission web page. The user's identity is then authenticated using the authentication process described above. If the user's identity is authentic, the user's bid for the product is accepted by the auction server 10 and stored in the database 12. The user's bid is identified for a particular product using the product's UIN. In alternative embodiments, the authentication process may be skipped when placing bids, or only required where the value of the product exceeds a predetermined value.

Users are able to enter two types of bids, a regular bid or an automatic, or proxy bid. A regular bid consists of a single bid for a specific value. An automatic bid specifies a maximum bid by the user. The auction and trade handler then acts as a proxy for the user bidding by the minimum increment for the product up to the user's specified maximum in an attempt to win the bidding for the product by the minimum possible incremental value.

Figure 4:
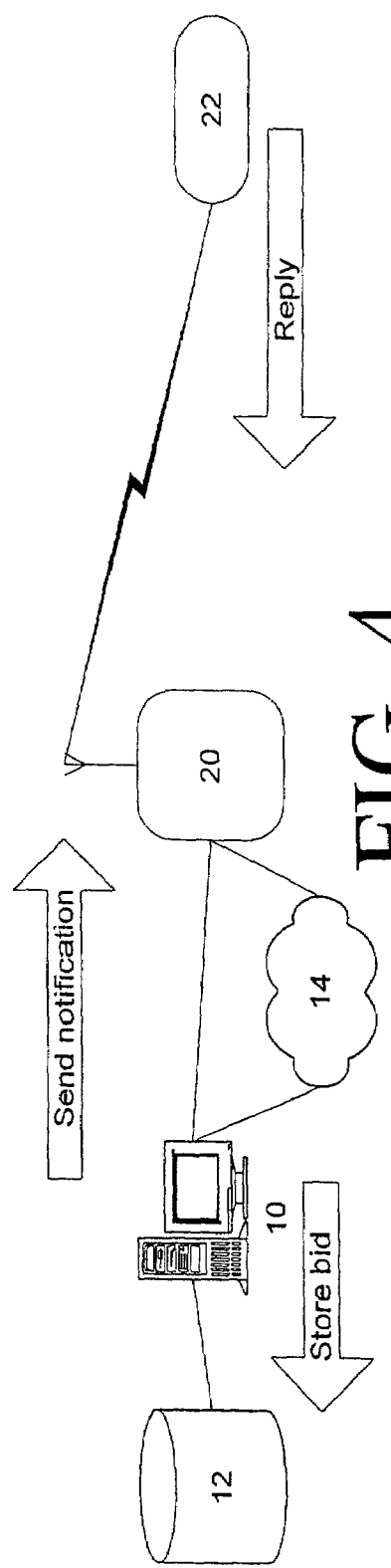
FIG. 4 is a schematic diagram showing generally how a user can receive notifications concerning his bids and submit further bids to the trade and auction system.

Once the user has registered their first bid for a product, notifications concerning the user's bid and further bids can be sent to and received from the user's GSM mobile phone without the need for the user to have access to his computer 16 or the computer network 14. FIG. 4 helps illustrate the notification and bid up process.

When a user's bid for a product is beaten, the auction and trade handler instructs the message dispatcher to send an SMS message to the user's GSM mobile phone 22. The auction and message trade handler retrieves the user's mobile phone number from the database 12 and forwards this to the message dispatcher to be included as the "recipient" field of the SMS message.

The auction and trade handler also forwards the product's UIN to the message dispatcher which concatenates the numeric access code of the auction server 10 with the received product UIN and inserts the resultant number in the "sender" field of the SMS message.

Finally, the auction and trade handler forwards a message text to the message dispatcher for inclusion as the message body of the SMS message. The message text composed by the auction and trade handler includes information concerning the product, such as the product title, the current highest bid, and instructions for placing a further bid. An example message text may read "You have been outbid for 'Antique Bookcase'. The current highest bid is now $1,050. To place another bid, simply reply to this message, and specify the bid type and amount."

The SMS message is sent by the message dispatcher directly to the GSM network's SMSC system server 20, which forwards it to the user's GSM mobile phone 22.

To place another bid for the product, the user simply needs to reply to the SMS message using the reply facility of the GSM mobile phone 22. Advantageously, the reply facility of the GSM mobile phone 22 will automatically take the number in the "sender" field of the original SMS message and insert it in the "recipient" field of the reply SMS message. Accordingly, there is no requirement for the user to recall e-mail addresses or product codes in order to place a subsequent bid. The user simply enters the type of bid and the amount of the bid in the body of the SMS message and sends the SMS message.

To place a regular bid for $1200, the user simply enters "regular 1200" as the text message of the reply SMS message. To place an automatic proxy bid for $1200, the user enters "auto 1200" as the text of the SMS message.

Once the user sends the SMS message, his GSM mobile phone 22 sends it to the GSM network's SMSC server system 20. The SMSC server system 20 identifies the numeric access code of the auction server 10 in the "recipient" field of the SMS message and forwards the SMS message directly to the message receiver of the auction server 10.

Upon receiving the SMS message, the message receiver extracts the product UIN from the "recipient" field of the SMS message, the user's mobile phone number from the "sender" field of the SMS message, and the text message of the SMS message and forwards these to the trade and auction handler.

The trade and auction handler is able to identify the product from the product UIN. Further, the trade and auction handler can identify the user from their GSM mobile telephone number. In the event that a higher bid has already been received from another user, or the user's bidding instructions were indecipherable, the auction and trade handler sends a reply SMS message to the user's GSM mobile phone 22 notifying them of the error. Otherwise, the trade and auction handler enters the bid from the user in the database 12 for that product. Optionally, if the bid is successfully received, the auction and trade handler may send a reply SMS message to the user's GSM mobile telephone 22 notifying them that his bid was successfully received.

In addition to sending notification to the previously highest bidder, the auction trade handler may also be arranged to send the same notifications to some or all of the users that have bid for that product.

As can be seen from the foregoing description, the invention provides a fast, efficient and convenient method and system for the authentication and transmission of instructions for an auction and trading system whose users have messaging-capable wireless devices such as SMS-enabled GSM devices.

The invention claimed is:

1. A method for the authentication of buyers and sellers and for the transmission of trading instructions in a trading and auction system, comprising the steps of:

Requiring that a prospective buyer or seller register with the trading and auction system before being able to place trading instructions, including requiring that said prospective buyer or seller provide a unique identifier of a SMS messaging-capable wireless device in the possession of the prospective buyer or seller, the SMS messaging-capable wireless device configured to send and receive short message protocol messages, each of the messages having a single 'Sender' field and a single 'Recipient' field;

Assigning a password to said prospective buyer or seller;

Communicating said password to said prospective buyer or seller and receiving a confirmation of said password from said prospective buyer or seller, wherein at least one of said steps of communicating said password and receiving a confirmation of said password are performed using said SMS wireless device's messaging capability;

Activating said prospective buyer or seller's account or trading instruction if said communicated password matches the assigned password;

Assigning a unique identification number to each product or service for sale or auction at said trading and auction system;

Sending short message protocol messages to a buyer's SMS messaging-capable wireless device concerning offers or bids made by that buyer in relation to a product or service when the buyer has been outbid or has no longer made a winning offer, with the unique identification number of the product or service included in the only 'Sender' field of each short message protocol message to the buyer;

Receiving higher bid short message protocol messages concerning a buyer's trading instructions on a product or service from that buyer's SMS messaging-capable wireless device wherein said unique identification number automatically inserted in the 'Recipient' field as a result of the buyer selecting a 'reply' option, determining the product or service by extracting and recognizing the unique identification number of the product or service from the only 'Recipient' field of received higher bid short message protocol messages from the buyer, identifying the buyer by extracting and recognizing the unique identifier of the SMS wireless device from the only 'Sender' field of each message from the buyer and parsing a text body of each higher bid short message protocol messages to determine the buyer's trading instructions for that product or service.

2. A method as claimed in claim 1, further comprising the step of requiring that a buyer authenticate their identity with the trading and auction system when placing their first trading instruction in relation to a product or service by an exchange of messages between the trading and auction system, in which at least one of said messages are sent or received using said SMS wireless device's messaging capability.

3. A method as claimed in claim 1 or 2, wherein said step of communicating said password to said prospective buyer or seller is performed over a computer network, and said step of receiving a confirmation of said password from said prospective buyer or seller is performed using said SMS wireless device's messaging capability.

4. A method as claimed in claim 1 or 2, wherein said step of communicating said password to said prospective buyer or seller is performed using said SMS wireless device's messaging capability, and said step of receiving a confirmation of said password from said prospective buyer or seller is performed over a computer network.

5. A method as claimed in claim 1, wherein said wireless device is serviced by a GSM network including a SMSC server to control and manage SMS to and from said wireless device, wherein said trading and auction system is in direct communication with said SMSC server.

6. A method as claimed in claim 1, wherein said step of sending messages to a buyer's SMS messaging-capable wireless device includes the step of concatenating an access identification number with the unique identification number of the product or service being bid on and placing said concatenated number in the only 'Sender' field of each message to the buyer, an SMSC server using the access identification number to identify whether SMS messages from the SMS messaging-capable wireless devices are destined for said trading and auction system and to forward such destined SMS messages directly to the trading and auction system.

7. A method as claimed in claim 1, wherein said trading and auction system is connected to an SMSC server via a computer network.

8. A method for the authentication of buyers and sellers in a trading and auction system, comprising the steps of:

Requiring that a prospective buyer or seller register with the trading and auction system before being able to place trading instructions, including requiring that said prospective buyer or seller provide a unique identifier of a SMS messaging-capable wireless device in the possession of the prospective buyer or seller, the SMS messaging-capable wireless device configured to send and receive SMS messages, each of the messages having a single 'Sender' field and a single 'Recipient' field;

Assigning a password to said prospective buyer or seller;

Communicating said password to said prospective buyer or seller performed over a computer network to a computer;

Concatenating an access identification number with a numeric address pertaining to and recognized by the system for registration purposes, placing said concatenated number in the only 'Sender' field of a SMS message, and sending the SMS message to said buyer or seller with instructions to enter the communicated password;

receiving a confirmation of said password from said prospective buyer or seller performed using said SMS messaging-capable wireless device's messaging capability, wherein the confirmation is received as a result of the buyer or seller selecting a 'reply' option, entering the communicated password into the reply SMS message, and said concatenated number is automatically inserted in the 'Recipient' field of the message; and Activating said prospective buyer or seller's account or trading instruction if said communicated password matches the assigned password.

9. A method as claimed in claim 8, further comprising the step of requiring that a buyer authenticate their identity with the trading and auction system when placing their first trading instruction in relation to a product or service by an exchange of messages between the trading and auction system, in which at least one of said messages are sent or received using said wireless device's messaging capability.

10. A method as claimed in claim 8, wherein said wireless device is serviced by a GSM network including a SMSC server to control and manage SMS to and from said wireless device, wherein said trading and auction system is in direct communication with said SMSC server.

11. A method as claimed in claim 10 wherein said SMSC server using the access identification number to identify SMS messages from wireless devices destined for said trading and auction system and to forward such SMS messages directly to the trading and auction system.

12. A method as claimed in claim 8, wherein said trading and auction system is connected to an SMSC server via a computer network.

13. A method for the transmission of trading instructions in a trading and auction system, comprising the steps of:

Assigning a unique identification number to each product or service for sale or auction at said trading and auction system;

Sending short message protocol messages to a buyer's SMS messaging-capable wireless device concerning offers or bids made by that buyer in relation to a product or service when the buyer has been outbid or has no longer made a winning offer, each of the short message protocol messages having a single 'Sender' field and a single 'Recipient' field, with the unique identification number of the product or service included in the only 'Sender' field of each short message protocol message to the buyer;

Receiving higher bid short message protocol messages concerning a buyer's trading instructions on a product or service from that buyer's SMS messaging-capable wireless device wherein said unique identification number automatically inserted in the 'Recipient' field as a result of the buyer selecting a 'reply' option, determining the product or service by extracting and recognizing the unique identification number of the product or service from the only 'Recipient' field of received higher bid short message protocol messages from the buyer, identifying the buyer by extracting and recognizing the unique identifier of the SMS wireless device from the only 'Sender' field of each message from the buyer and parsing a text body of each message from the buyer to determine the buyer's trading instructions for that product or service.

14. A method as claimed in claim 13, further comprising the step of requiring that a buyer authenticate their identity with the trading and auction system when placing their first trading instruction in relation to a product or service by an exchange of messages between the trading and auction system, in which at least one of said messages are sent or received using said SMS wireless device's messaging capability.

15. A method as claimed in claim 14, wherein said step of exchanging messages comprises the steps of sending a password to said prospective buyer or seller over a computer network, and receiving a confirmation of said password from said prospective buyer or seller using said SMS wireless device's messaging capability.

16. A method as claimed in claim 14, wherein said step of exchanging messages comprises the steps of sending a password to said prospective buyer or seller using said SMS wireless device's messaging capability, and receiving a confirmation of said password from said prospective buyer or seller over a computer network.

17. A method as claimed in any one of claims 13 to 16, wherein said wireless device is serviced by a GSM network including a SMSC server to control and manage SMS to and from said wireless device, wherein said trading and auction system is in direct communication, via a direct link or through the internet, with said SMSC server.

18. A method as claimed in claim 13, wherein said step of sending messages to a buyer's SMS messaging-capable wireless device includes the step of concatenating an access identification number with the unique identification number of the product or service and placing said concatenated number in the only 'Sender' field of each message to the buyer, an SMSC server using the access identification number to identify SMS messages from wireless devices destined for said trading and auction system and to forward such SMS messages directly to the trading and auction system.

19. A method as claimed in claim 13, wherein said trading and auction system is connected to an SMSC server via a computer network.

20. A trading and auction system, comprising:

registration handling means for receiving a unique identifier of a SMS messaging-capable wireless device in the possession of a prospective buyer or seller, the SMS messaging-capable wireless device configured to send and receive short message protocol messages, each of the messages having a single 'Sender' field and a single 'Recipient' field;

message dispatching means for sending short message protocol messages to a prospective buyer or seller's SMS messaging-capable wireless device;

message receiving means for receiving short message protocol messages from a prospective buyer or seller's SMS messaging-capable wireless device;

said registration handling means arranged to assign a password to said prospective buyer or seller, and to communicate said password to said prospective buyer or seller and receive a confirmation of said password from said prospective buyer or seller, wherein said password is communicated to said prospective buyer or seller's SMS wireless device via said message dispatching means and/or said confirmation of said password is received from said prospective buyer or seller's wireless device via said message receiving means, said registration handling means arranged to activate said prospective buyer or seller's account or trading instruction if said confirmation of said password matches the assigned password;

unique identification number assigning means to automatically allocate a unique identification number to each product or service for sale or auction on said trading and auction system;

database means for storing the unique identification number of each product and service for sale or auction on said trading and auction system and for storing the unique identifier of each buyer or seller's SMS wireless device; and trade and auction handling means arranged to send short message protocol messages to a buyer's SMS messaging-capable wireless device concerning offers or bids made by that buyer in relation to a product or service via said message dispatching means, with the unique identification number of the product or service included in the only 'Sender' field of each short message protocol message to the buyer;

said trade and auction handling means further arranged to receive short message protocol messages concerning a buyer's trading instructions on a product or service from that buyer's SMS messaging-capable wireless device via said message receiving means wherein said unique identification number automatically inserted in the 'Recipient' field as a result of the buyer selecting a 'reply' option, and to determine the product or service by extracting and recognizing the unique identification number of the product or service from the only 'Recipient' field of received short message protocol messages from the buyer, identify the buyer by extracting and recognizing the unique identifier of the SMS wireless device from the only 'Sender' field of each message from the buyer, parse a text body of each message from the buyer to determine the buyer's trading instructions for that product or service and execute said trading instructions.

21. A trading and auction system as claimed in claim 20, wherein said trade and auction handling means is arranged to require that a buyer authenticate their identity with the trading and auction system when placing their first trading instruction in relation to a product or service by an exchange of messages with the trading and auction system, wherein one of said messages is communicated to said buyer's wireless device via said message dispatching means and/or another of said messages is received from said buyer's wireless device via said message receiving means.

22. A trading and auction system as claimed in claim 20 or 21, wherein said wireless device is serviced by a GSM network including a SMSC server to control and manage SMS to and from said wireless device, said message dispatching means and message receiving means being in direct communication with said SMSC server to send and receive SMS therefrom, respectively.

23. A trading and auction system as claimed in claim 20, wherein said message dispatching means is arranged to concatenate an access identification number with the unique identification number of the product or service and place said concatenated number in the only 'Sender' field of each message sent to a buyer concerning that product or service, an SMSC server using the access identification number to identify SMS messages from the buyer's wireless device destined for said trading and auction system and to forward such SMS messages directly to the message receiving means.

24. A trading and auction system as claimed in claim 20, wherein said message dispatching means and message receiving means are connected to an SMSC server via a computer network.

25. A trading and auction system, comprising:
   registration handling means for receiving a unique identifier of a SMS messaging-capable wireless device in the possession of a prospective buyer or seller, the SMS messaging-capable wireless device configured to send and receive short message protocol messages, each of the messages having a single 'Sender' field and a single 'Recipient' field;
   message dispatching means for sending short message protocol messages to a prospective buyer or seller's SMS messaging-capable wireless device;
   message receiving means for receiving short message protocol messages from a prospective buyer or seller's SMS messaging-capable wireless device;
   database means for storing the unique identifier of each buyer or seller's SMS messaging-capable wireless device;
   said registration handling means arranged to assign a password to said prospective buyer or seller, and to communicate said password to said prospective buyer or seller and receive a confirmation of said password from said prospective buyer or seller, wherein said password is communicated to said prospective buyer or seller registering through a computer via a computer network, and an SMS message is sent to said prospective buyer or seller's SMS wireless device via said message dispatching means by concatenating an access identification number with a numeric address pertaining to the registration handling means, placing said concatenated number in the-only 'Sender' field of a SMS message, and sending instructions in the SMS message to said buyer or seller for entering the password received at the computer, and/or said confirmation of said password is received from said prospective buyer or seller's SMS wireless device via said message receiving means as a result of the buyer or seller selecting a 'reply' option, entering the communicated password into the reply SMS message, and said concatenated number is automatically inserted in the 'Recipient' field of the message, said registration handling means arranged to activate said prospective buyer or seller's account or trading instruction if said confirmation of said password matches the assigned password.

26. A trading and auction system as claimed in claims 25, wherein said wireless device is serviced by a GSM network including a SMSC server to control and manage SMS to and from said wireless device, said message dispatching means and message receiving means being in direct communication with said SMSC server to send and receive SMS therefrom, respectively.

27. A trading and auction system as claimed in claim 25 or 26, wherein said message dispatching means and message receiving means are connected to an SMSC server via a computer network.

28. A trading and auction system, comprising:
   message dispatching means for sending short message protocol messages to a prospective buyer or seller's SMS messaging-capable wireless device, the SMS messaging-capable wireless device configured to send and receive short message protocol messages, each of the messages having a single 'Sender' field and a single 'Recipient' field;
   message receiving means for receiving short message protocol messages from a prospective buyer or seller's SMS messaging-capable wireless device;
   unique identification number assigning means to automatically allocate a unique identification number to each product or service for sale or auction on said trading and auction system;
   database means for storing the unique identification number of each product and service for sale or auction on said trading and auction system; and
   trade and auction handling means arranged to send short message protocol messages to a buyer's SMS messaging-capable wireless device concerning offers or bids made by that buyer in relation to a product or service via said message dispatching means, with the unique identification number of the product or service included in the only 'Sender' field of each short message protocol message to the buyer;
   said trade and auction handling means further arranged to receive short message protocol messages concerning a buyer's trading instructions on a product or service from that buyer's SMS wireless device via said message receiving means wherein said unique identification number automatically inserted in the 'Recipient' field as a result of the buyer selecting a 'reply' option, and to determine the product or service by extracting and recognizing the unique identification number of the product or service from the only 'Recipient' field of received short message protocol messages from the buyer, identify the buyer by extracting and recognizing a unique identifier of the SMS wireless device from the only 'Sender' field of each message from the buyer, parse a text body of each message from the buyer to determine the buyer's trading instructions for that product or service and execute said trading instructions.

29. A trading and auction system as claimed in claim 28, wherein said trade and auction handling means is arranged to require that a buyer authenticate their identity with the trading and auction system when placing their first trading instruction in relation to a product or service by an exchange of messages with the trading and auction system, wherein one of said messages is communicated to said buyer's wireless device via said message dispatching means and/or another of said messages is received from said buyer's wireless device via said message receiving means.

30. A trading and auction system as claimed in claim 28 or 29, wherein said wireless device is serviced by a GSM network including a SMSC server to control and manage SMS to and from said wireless device, said message dispatching means and message receiving means being in direct communication with said SMSC server to send and receive SMS therefrom, respectively.

31. A trading and auction system as claimed in claim 28, wherein said message dispatching means is arranged to concatenate an access identification number with the unique identification number of the product or service and place said concatenated number in the only 'Sender' field of each message sent to a buyer concerning that product or service, an SMSC server using the access identification number to identify SMS messages from the buyer's wireless device destined for said trading and auction system and to forward such SMS messages directly to the message receiving means.

32. A trading and auction system as claimed in claim 28, wherein said message dispatching means and message receiving means are connected to an SMSC server via a computer network.

* * * * *